(12) United States Patent
Thompson et al.

(10) Patent No.: US 7,156,890 B1
(45) Date of Patent: Jan. 2, 2007

(54) HUBCAP FILTER

(75) Inventors: Laurence Thompson, Fresno, CA (US); Matthew Messer, Fresno, CA (US); Kevin Carlson, Fresno, CA (US)

(73) Assignee: Di-Pro, Inc., Fresno, CA (US)

( * ) Notice: Subject to any disclaimer, the term of this patent is extended or adjusted under 35 U.S.C. 154(b) by 291 days.

(21) Appl. No.: 10/788,708

(22) Filed: Mar. 1, 2004

(51) Int. Cl.
*B01D 46/00* (2006.01)
*B60B 7/00* (2006.01)

(52) U.S. Cl. .................. 55/385.3; 55/385.1; 55/486; 55/487; 55/495; 55/501; 55/502; 55/503; 55/523; 55/528; 96/4; 96/11; 301/108.1

(58) Field of Classification Search ............... 55/385.1, 55/385.2, 385.3, 385.4, 495, 501, 503, 502, 55/505, 522, 523, 527, 528, 856.3, 486, 487, 55/488; 96/4, 11; 301/108.1, 108.2, 108.3, 301/108.4, 108.5
See application file for complete search history.

(56) References Cited

U.S. PATENT DOCUMENTS

| | | | |
|---|---|---|---|
| 5,192,117 A * | 3/1993 | Kuck ................ 301/108.1 |
| 5,482,358 A | 1/1996 | Kuck | |
| 5,492,393 A * | 2/1996 | Peisker et al. ........ 301/108.1 |
| 5,664,846 A | 9/1997 | Kuck | |
| 5,752,746 A | 5/1998 | Perry | |
| 5,785,390 A | 7/1998 | Gold et al. | |
| 5,860,708 A * | 1/1999 | Borders et al. ........ 301/108.1 |
| 5,914,415 A * | 6/1999 | Tago ................ 55/385.4 |
| 6,394,159 B1 * | 5/2002 | Cobb ................ 152/416 |
| 6,468,332 B1 * | 10/2002 | Goglio et al. ........ 55/385.4 |
| 6,524,361 B1 * | 2/2003 | Thornton et al. ........ 55/385.4 |
| 6,783,191 B1 * | 8/2004 | Slesinski et al. ........ 301/108.1 |

* cited by examiner

*Primary Examiner*—Jason M. Greene
(74) *Attorney, Agent, or Firm*—Charles H. Thomas

(57) ABSTRACT

A hubcap breather assembly is provided for a hubcap housing lubricated wheel bearings in an automotive vehicle. The breather assembly includes a resilient, annular collar that fits into an access opening in a hubcap end wall, a filter cartridge cup, and a filter cartridge lid which fit together to hold a filter therebetween in a filter cartridge chamber. The filter is a hydrophobic, gas-permeable, particular matter filter that is disposed within and extends entirely across the filter cartridge chamber. Ambient air entering the hubcap through the hubcap breather assembly is filtered to exclude both particulate matter and water before entering the wheel bearing chamber. The filter is preferably formed of three layers, including an outboard porous layer of sintered polypropylene plastic, an intermediate hydrophobic layer of polytetrafluoroethylene, and an inboard porous layer of sintered polypropylene plastic. The filter can be replaced by separating the filter cartridge lid from the filter cartridge cup.

26 Claims, 5 Drawing Sheets

HUBCAP FILTER

BACKGROUND OF THE INVENTION

1. Field of the Invention

The present invention relates to a hubcap breather assembly located in a hubcap for an automotive vehicle, particularly a heavy-duty vehicle such as a truck trailer or truck tractor.

2. Description of the Prior Art

The wheel and axle assemblies of certain automotive vehicles, particularly large trailers and semi-trailers and the tractors used to pull them, are formed with wheel hubs having lubricant chambers. The wheel bearing lubricant chambers are located at the outboard ends of the axles and contain the wheel bearings and also a lubricant, such as lubricating oil. The lubricating oil partially fills the lubricant chambers and forms a continuous bath through which the wheel bearings of the wheel pass in rotation as the wheel turns. The wheel bearing lubricant chambers are thereby partially filled with air and partially filled with a lubricating liquid, such as lubricating oil.

During operation of the automotive vehicle the temperature of the wheel bearings rises considerably above ambient atmospheric temperature. During periods of nonoperation of the vehicle the temperature of the wheel bearings falls, and approaches ambient atmospheric temperature when the automotive vehicle remains parked for a considerable period of time. The changes in temperature result in changes in pressure within the wheel bearing lubricant chambers, since the gasses in the atmosphere, primarily nitrogen and oxygen, contract upon cooling and expand upon heating. Therefore, it has long been advisable for the wheel bearing chambers to be vented to atmosphere. This allows pressure within the sealed bearing chambers to equalize with surrounding atmospheric pressure irrespective of the temperature of the lubricant in the lubricant chamber so that the wheel bearing chamber seals do not rupture.

However, the venting of the lubricant chamber to atmosphere creates certain problems. Specifically, as air passes into a bearing lubricant chamber to equalize pressure therewithin when the vehicle is parked or operating at a lower speed, airborne dirt, dust, and water can enter the lubricant chamber. These contaminants become entrapped in the lubricant and cause excessive wear on the wheel bearings and excessively high temperatures in the lubricant chamber when the vehicle is subsequently operated. This leads to a reduction of useful life for the wheel bearings and lubricant seals.

Various systems have been devised to attempt to filter air passing into lubricant chambers that contain lubricant and wheel bearings. Some of these are described, for example, in the following issued United States patents: U.S. Pat. Nos. 5,482,358; 5,664,846; 5,752,746; 5,785,390; and 5,860,708. Each filtration system employed in these prior devices adopts its own particular approach to the problem. However, none of these prior devices has been particularly effective in excluding dust, dirt, water, and other contaminants from the hubcap lubricating chambers in automotive vehicle wheels.

SUMMARY OF THE INVENTION

The present invention provides a uniquely configured hubcap breather assembly and filtration arrangement that very effectively prevents lubricant within the lubricant chamber for the wheel bearings of an automotive vehicle from becoming contaminated. By utilizing the breather and filtration system of the present invention, bearing and seal life for automotive vehicle wheels can be extended significantly.

In one broad aspect the present invention may be considered to be a hubcap breather assembly for mounting in an access opening in a hubcap end wall to seal lubricated wheel bearings in an automotive vehicle. The hubcap breather assembly of the invention is comprised of a resilient, annular collar, a filter cartridge cup, a filter cartridge lid, and a hydrophobic, gas-permeable particulate matter filter.

The resilient, annular collar has a radial exterior surface configured to fit within the access opening in fluid-tight sealed engagement therewith. The collar also has a radial interior surface configured to form a filtration cartridge seat. The filter cartridge cup has an open, axial outboard mouth, an annular peripheral wall, and a transverse axial inboard floor with at least one breather port defined therethrough. The filter cartridge cup is seated upon the filtration cartridge seat.

The filter cartridge lid has a transverse roof with at least one vent opening formed therein. The filter cartridge lid has a peripheral rim engaged in fluid-tight sealed relationship with the filter cartridge mouth to define a filter cartridge chamber within the confines of the filter cartridge cup and filter cartridge lid. The hydrophobic, gas-permeable particulate matter filter is disposed within and extends entirely across the filter cartridge chamber.

The filter may be fabricated from different materials that are either naturally hydrophobic or which can be formulated to have hydrophobic properties. For example, the filter can be made from various sintered thermoset polymers and/or various sintered thermoplastic polymers. The filter material may be comprised of a substance selected from the group consisting of: high density polyethylene (HDPE), ultra molecular weight polyethylene (UHMWPE), polypropylene (PP), polytetrafluoroethylene (PTFE), nylon, polyvinylidine fluoride (PVDF), polyethersulfone (PES). The filter may be comprised of one or more layers. The filter preferably includes a first porous layer for screening particulate matter and a second hydrophobic layer located inboard from the first porous layer. The second, hydrophobic layer serves as a screen to prevent water from reaching the lubricant chamber. The first porous layer is preferably comprised of sintered polypropylene plastic, while the second, hydrophobic layer is preferably comprised of a sheet of polytetrafluoroethylene.

Preferably also, the filter includes a third porous layer for screening particulate matter. This third layer is located inboard from the second, hydrophobic layer. The third layer is preferably formed of sintered polypropylene plastic. The hydrophobic polytetrafluoroethylene layer is thereby sandwiched in between the two layers designed to entrap particular matter.

The term "inboard" as utilized herein refers to the axial direction along a vehicle wheel axis oriented perpendicular to and directed toward the center line of the vehicle. The term "outboard" as used herein refers to the opposite direction, that is, outwardly, away from the center line of the vehicle and perpendicular to the alignment of the vehicle. The term "longitudinal", as utilized herein, refers to a linear orientation which is on or parallel to an axis of rotation of a hubcap. The term "radial", as utilized herein, refers to an orientation that is perpendicular to longitudinal orientation.

The floor of the filter cap is preferably formed with a single, axially centered breather port, while the roof is preferably formed with a plurality of vent openings. A plenum cavity is preferably formed that is in communication with all of the vent openings. The plenum cavity is defined between the roof of the filter cartridge lid and the outboard side of the filter itself.

In a preferred embodiment of the invention the filter cartridge cup is formed with a plurality of mutually parallel positioning pins spaced about its mouth and extending in an outboard direction from its mouth. The peripheral rim of the filter cartridge lid is preferably formed with a plurality of mutually parallel sockets formed in the peripheral rim and aligned with the positioning pins. The positioning pins are frictionally engageable in the sockets.

The filter cartridge cup and the filter cartridge lid can be formed with internal shoulders so as to clamp the filter in position in between the filter cartridge cup and the filter cartridge lid. Such shoulders may be formed on the underside of the filter cartridge lid by a plurality of radially directed spacer ribs projecting in an inboard direction from the underside of the roof. These ribs extend radially inwardly from the rim. The edges of the ribs that face the filter in the inboard direction form shoulders for holding the filter at a spaced distance from the underside of the roof. The ribs thereby form a plenum cavity between the roof of the filter cartridge lid and the filter.

The invention may also be considered to be a vented hubcap end closure device for sealing lubricated wheel bearings in an automotive vehicle wheel. The hubcap end closure device of the invention is comprised of a resilient, annular collar, a filter cartridge cup, a filter cartridge cap, and a filtration device. The collar has a radial outer periphery configured for fluid-tight sealing engagement in a wheel bearing plug opening in an end wall of an automotive vehicle wheel hubcap. The annular collar has a radial inner wall configured to seat a filter unit which is comprised of the filter cartridge cup, the filter cartridge cap, and the filtration device.

The filter cartridge cup has a radial outer periphery seated against the inner wall of the collar with an outboard rim forming a open mouth. The filter cartridge cup also has a transverse, inboard floor with at least one breather port defined therethrough. The filter cartridge cap is secured to the outboard rim of the filter cartridge cup in fluid-tight sealing engagement with the collar. The filter cartridge cap has a transverse roof that defines a filter cartridge chamber located between the filter cartridge cup floor and the filter cartridge cap roof. The roof has at least one vent opening defined therethrough.

The filtration device extends transversely and entirely across the filter cartridge chamber. The filtration device serves as a barrier to the passage of moisture and particulate matter between the vent openings and the breather port or breather ports.

The invention may also be considered to be a vented hubcap closure assembly for closing a wheel end bearing chamber containing a fluid lubricant. The hubcap closure assembly of the invention is comprised of a resilient annular collar, an inboard filter cartridge cup, a filter cartridge lid, and a filtration structure. The fluid lubricant is located behind a hubcap end wall that has a central, axial plug opening therein. The collar is inserted into the plug opening and has a radial, outer wall surface that establishes a fluid-tight seal with the hubcap end wall at the central, axial plug opening therein. The collar has a radial inner wall surface having an annular gripping ring defined thereon.

The inboard filter cartridge cup has a radial, outer, annular wall with longitudinal outboard and inboard ends. The filter cartridge cup has a radial outer surface residing in fluid-tight sealed engagement with the radial inner wall of the resilient collar. The filter cartridge cup is immobilized from longitudinal movement by the gripping ring. The filter cartridge cup has a floor extending across its longitudinal, inboard end. A central, axial breather port is defined through the filter cartridge cup floor.

The filter cartridge lid is seated in the collar and has an annular rim disposed in fluid-tight sealing engagement throughout with the radial inner wall surface of the annular collar. The filter cartridge lid has a central roof with at least one vent opening therein. A filter cartridge chamber is formed between the roof of the filter cartridge lid and the floor of the filter cartridge cup. The filtration structure extends entirely across the filter cartridge chamber and is held in position by the filter cartridge cup and the filter cartridge lid. The filtration structure permits the free passage of air therethrough and excludes the passage of water and particulate matter.

The invention may be described with greater clarity and particularity by reference to the accompanying drawings.

DESCRIPTION OF THE EMBODIMENT

Figure 1:
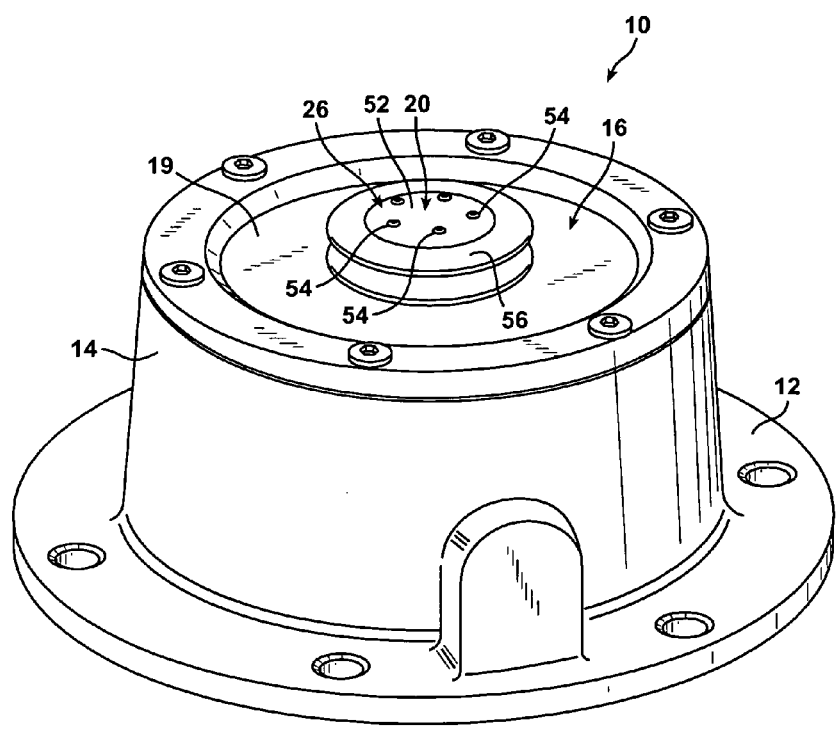
FIG. 1 is a perspective view from the exterior illustrating a vented hubcap according to the invention.
Figure 2:
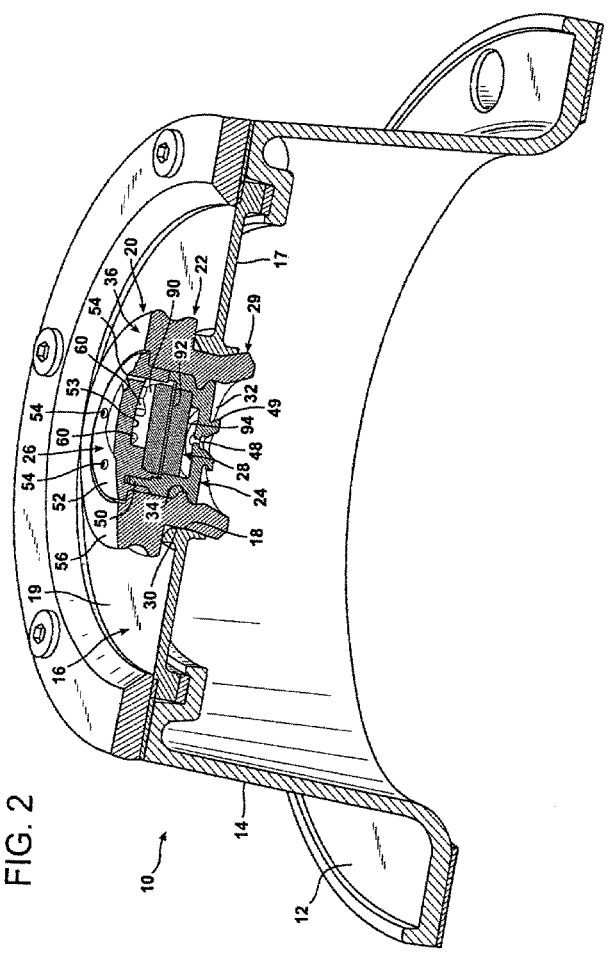
FIG. 2 is a sectional, perspective view of the vented hubcap of FIG. 1.

FIG. 1 illustrates a vented hubcap 10 of the type employed on heavy-duty cargo truck trailers and the tractors that pull those trailers. The hubcap 10 is provided with a flange 12 that is bolted onto the wheel assembly, a generally frusto-conical portion 14 that houses the wheel bearings and the lubricant for the wheel bearings, and a generally disc-shaped end wall 14 having a circular access opening 18 formed therein, as shown in FIG. 2.

A hubcap breather or end closure assembly according to the invention is indicated generally at 20. The hubcap breather assembly 20 is comprised of a resilient, annular rubber collar 22, a rigid plastic filter cartridge cup 24, a rigid plastic filter cartridge lid or cap 26, and a hydrophobic, gas-permeable particulate matter filter 28.

The vented hubcap closure assembly 20 is provided for closing a wheel end bearing chamber formed by the surface 17 of the end wall 16 that faces in an inboard direction, and the interior surface 15 of the encircling hubcap wall 14. The resilient rubber collar 22 is inserted into the plug opening 18 in the hubcap end wall 16. The collar 22 has an inboard, annular core portion 29 with a radial, outer wall surface 30 that establishes a fluid-tight seal with the hubcap end wall 16 at the central, axial plug opening 18 therein. The core portion 29 of the rubber collar 22 also has a radial inner wall surface 32 having an annular gripping ring 34 defined thereon. The gripping ring 34 extends radially inwardly about the entire circumference of the radial inner wall surface 32. The annular collar 22 also has an annular flange portion 36 that is located outboard of the core portion 29 and outboard of the exposed surface 19 of the hubcap end wall 16.

The filter cartridge cup 24 is located radially within the core portion 29 of the collar 22 and has an outer, annular wall 40 with a longitudinal outboard end 42 and a longitudinal inboard end 44. The radial outer surface of the outer filter cartridge cup wall 40 resides in fluid-tight sealed engagement with the radial inner wall surface 32 of the core portion 29 of the resilient collar 22. The core portion of the collar 22 provides a seat for the filter cartridge cup 24 by interengagement of the radially inwardly directed ring 34 of the collar 24 that fits into a corresponding radially inwardly directed, channel-shaped groove at the inboard end 44 of the filter cartridge cup wall 40. Due to the resiliency of the structure of the collar 22, the filter cartridge cup 24 can be pressed longitudinally into the core portion 29 of the collar 22 from the inboard side thereof until the gripping ring 34 of the collar 22 engages the channel-shaped recess in the filter cartridge cup 24.

The filter cartridge cup 24 is closed at its inboard end by a floor 46 that extends across its longitudinal inboard end 44. A central, axial breather port 48 is defined through the center of the filter cartridge cup floor 46. An annular, conical shield 49 depends from the inboard underside of the filter cartridge cup floor 46.

Figure 5:
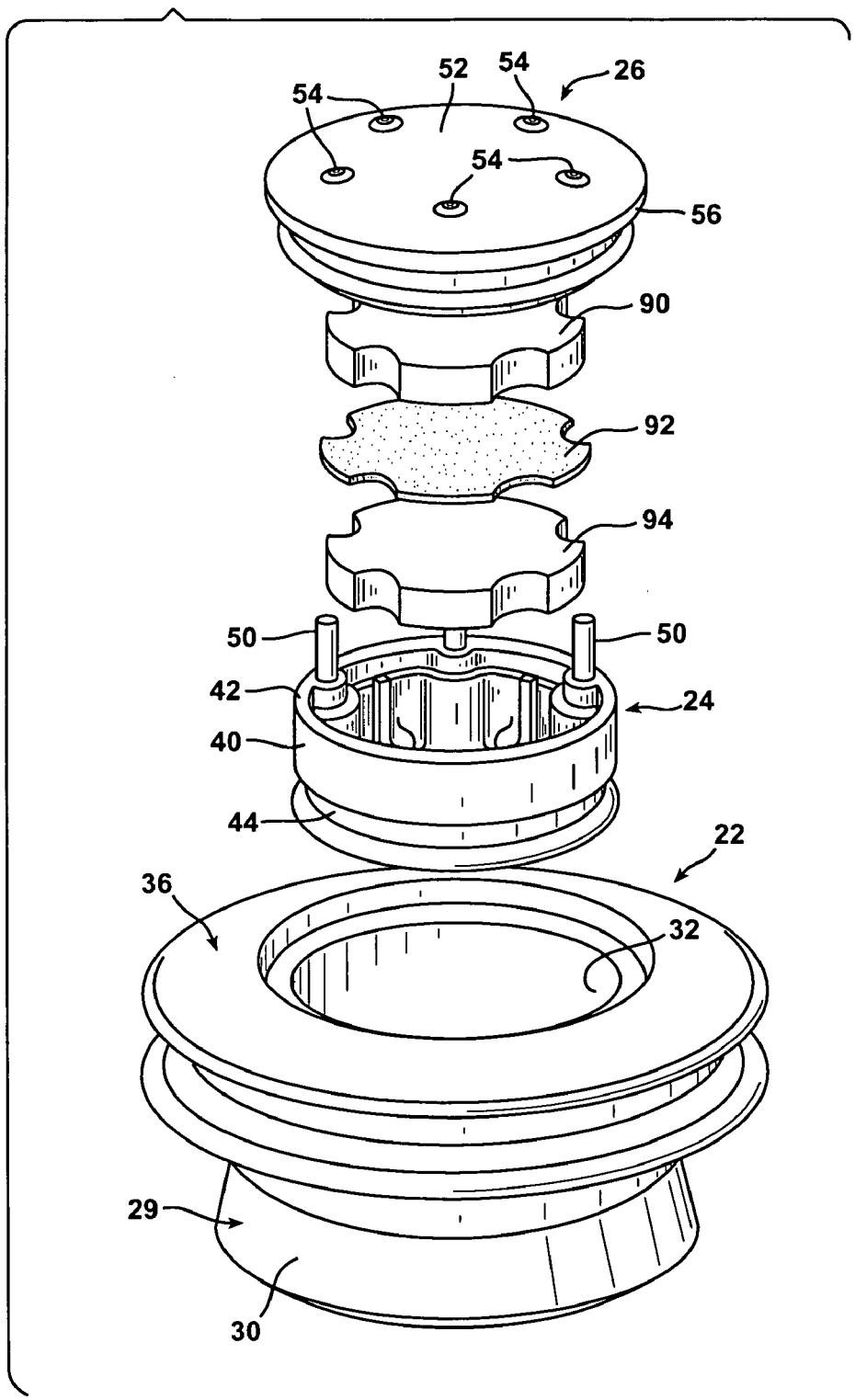
FIG. 5 is an exploded perspective view of the vented hubcap closure assembly illustrated in FIGS. 3 and 4.

At the outboard end 42 of the outer annular wall 40, the filter cartridge cup 24 forms an open, axial outboard mouth having a generally annular configuration, as best illustrated in FIG. 5. As shown in that drawing figure, the filter cartridge cup 24 is formed with a plurality of longitudinally extending, mutually parallel positioning pins 50 spaced about the periphery of its open mouth. The positioning pins 50 are preferably tapered slightly, narrowing in diameter from their inboard to outboard extremities.

The filter cartridge lid 26 has a transverse, generally disc-shaped roof 52 with at least one vent opening therein. In the preferred embodiment of the invention, the roof 52 is provided with five separate vent openings 54, spaced a uniform radial distance from the axial center of the lid 26 at equal angles of separation from each other. The filter cartridge lid 26 has a peripheral rim 56 that is engaged in fluid-tight sealed relationship with the filter cartridge cup mouth to define a filter cartridge chamber within the confines of the filter cartridge cup 24 and the filter cartridge lid 26. That is, the filter cartridge chamber may be considered to be the cavity formed between the internal surfaces of the filter cartridge cup floor 46, the filter cartridge lid roof 52, and the interior surface of the filter cartridge cup wall 40. The filter 28 is disposed within and extends entirely across the filter cartridge chamber and resides in contact with the interior surface of the filter cartridge cup wall 40 throughout the entire internal circumference thereof.

Figure 3:
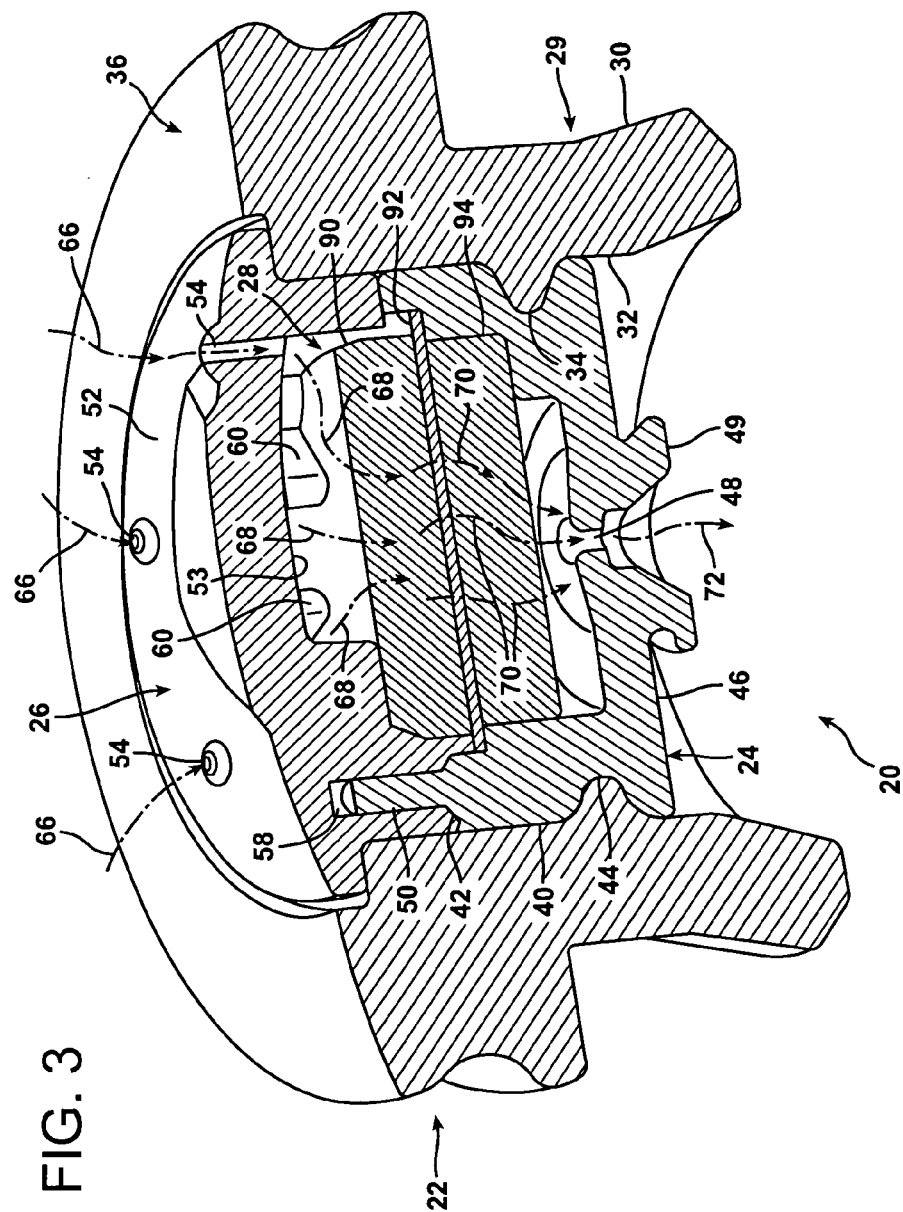
FIG. 3 is a sectional, perspective view of a vented hubcap closure assembly according to the invention, showing the direction of airflow when internal pressure within the bearing chamber is less than external ambient air pressure.
Figure 4:
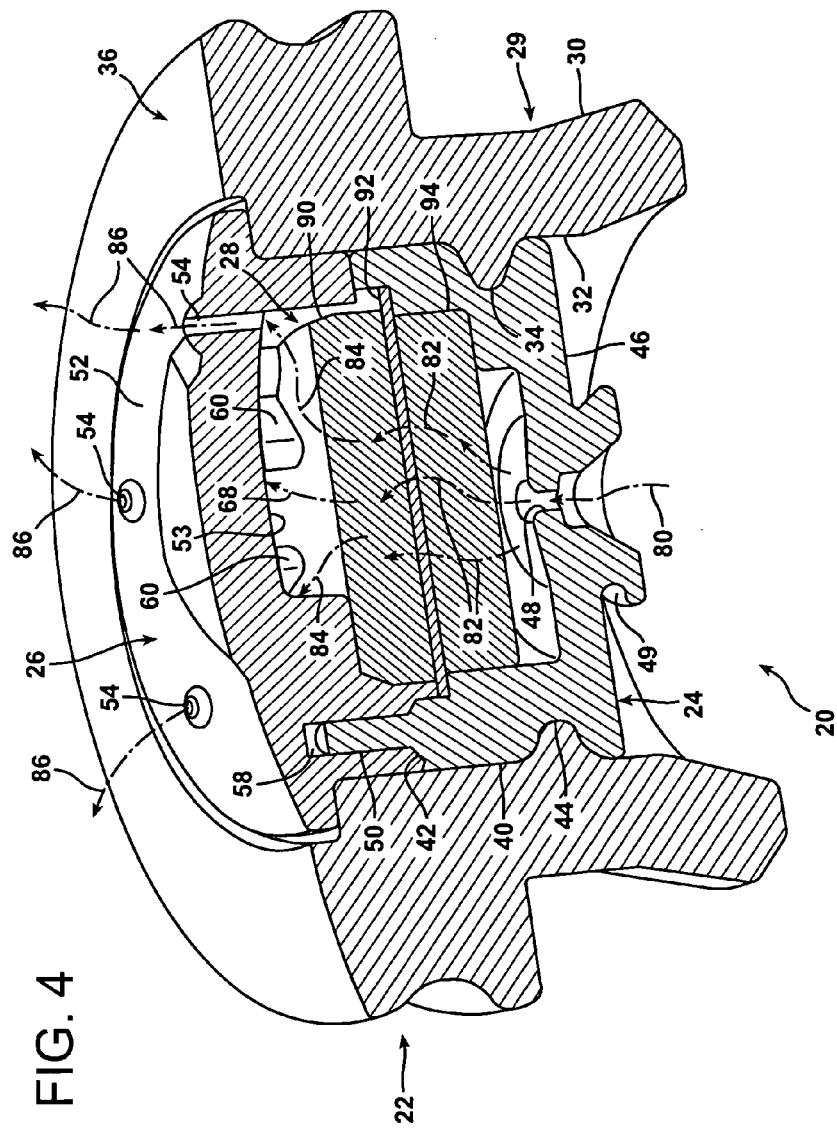
FIG. 4 is a sectional, perspective view of a vented hubcap closure assembly according to the invention, showing the direction of airflow when internal pressure within the bearing chamber is greater than external ambient air pressure.

The filter cartridge lid 26 is formed with a plurality of mutually parallel, generally cylindrical-shaped sockets 58, one of which is visible in FIGS. 2, 3, and 4. The sockets 58 are formed in the undersurface of the peripheral rim 56 at a radial distance from the axial center of the lid 26 and in angular displacement from each other so that they are aligned with the positioning pins 50 of the filter cartridge cup 24.

FIG. 5 shows the filter cartridge lid 26 separated from the filter cartridge cup 24. When the components of the hubcap closure assembly 20 are assembled together, the positioning pins 50 are received within the sockets 58 in frictional engagement therewith with the filter 28 encapsulated in the filter cartridge chamber between the internal surfaces of the filter cartridge cup 24 and the filter cartridge lid 26.

The roof 52 of the filter cartridge lid 26 has an undersurface 53 that faces downwardly in an inboard direction toward the floor 46 of the filter cartridge cup 24. The filter cartridge lid 26 is formed with a plurality of radially directed spacer ribs 60 on the underside 53 of the roof 52. The ribs 60 terminate short of the mouth of the filter cartridge cup 24 at the open end 42 of the filter cartridge cup wall 40, but extend far enough toward the filter cartridge chamber so that the inboard edges form shoulders that bear against the outboard face of the filter 28. The space between the outboard face of the filter 28 and the underside of the filter cartridge lid roof 52 forms a plenum cavity between the roof 52 and the filter 28.

When the components of the hubcap breather assembly 20 are assembled together as illustrated in drawing FIGS. 1–4, the vented hubcap closure device 20 of the invention equalizes pressure within the wheel bearing chamber located within the confines of the hubcap 10 and ambient air. When the vehicle is operated, the wheel bearings will heat up, along with the lubricant for those bearings, to a temperature greater than ambient temperature. The temperature within the wheel bearing chamber will thereupon increase. Conversely, when the vehicle is brought to a halt and the wheels are no longer rotating, the temperature within the wheel bearing chamber will cool.

The changes in relative temperature between the wheel bearing chamber and ambient air cause air to flow into and out of the filter cartridge chamber, as illustrated in FIGS. 3 and 4. More specifically, as the wheel bearing chamber cools, ambient air will flow from the exterior of the hubcap 10 into the vent openings 54, as indicated by the directional arrows 66 in FIG. 3. Air is drawn from the vent openings 54, through the plenum chamber and into the filter cartridge chamber, as indicated by the directional arrows 68 in FIG. 3. To reach the lubricated wheel bearing chamber the air must flow through the filter 28, as indicated by the directional arrows 70. Air emanating from the inboard side of the filter 28 then flows through the breather port 48 and into the cavity within the hubcap 10 containing the wheel bearings, as indicated by the directional arrows 72.

Reverse flow occurs when temperature rises within the hubcap 10, as illustrated in FIG. 4. When this occurs air will flow from within the hubcap 10 out of the central, axial vent opening 48, as indicated by the directional arrow 80, through the filter 28, as indicated by the directional arrows 82, to the plenum chamber on the outboard side of the filter 28. Air then flows through the plenum chamber, as indicated by the directional arrows 84, out of the vent openings 54, and into ambient atmosphere, as indicated by the directional arrows 86.

It should be noted that all air that flows through the breather assembly 20 of the invention must pass through the filter 28, whether air flow in is an inboard direction, as indicated by the directional arrows 70 in FIG. 3, or in an outboard direction, as indicated by the directional arrows 82 in FIG. 4. The purpose of the filter 28 is to ensure that dirt, particulate matter, and moisture that normally exist in the ambient atmosphere do not pass through the breather port 48. To this end the filter 28 is constructed in such a manner as to be gas permeable, but to keep moisture and particulate matter from passing beyond the plenum chamber at the outboard side of the filter 28.

Preferably, the filter 28 is comprised of a first, porous layer 90 of sintered polypropylene plastic; a second, hydrophobic layer 92 comprised of a sheet of polytetrafluoroethylene; and third, porous layer 94, also formed of sintered polypropylene plastic. The hydrophobic layer 92 is sandwiched between the two particulate screening layers 90 and 94. The hydrophobic layer 92 is preferably fabricated from polytetrafluoroethylene sold under the registered trademark Tetratex® PTFE Membranes by Donaldson Company, Inc., which can be accessed through the Internet at www.donaldson.com.

With the expansion and contraction of air within the hubcap 10 there is alternating bidirectional airflow through the filter 28. Moisture and particulate matter are entrapped on the outboard side of the hydrophobic filter layer 92 when air is drawn into the hubcap 10, as illustrated in FIG. 3. When air flows in the opposite direction, as illustrated in FIG. 4, the entrapped water and particulate matter are to, at least to some extent, flushed out of the hubcap breather assembly 20 through the plenum cavity and the vent openings 54. The system, therefore, exhibits a certain amount of self-cleaning ability due to the bidirectional flow through the filter element 28.

By employing the hubcap filtration system of the present invention, the wheel bearing and seal life of a heavy-duty automotive vehicle wheel can be extended very significantly. This results in reduced maintenance costs and less down time for repairs. However, should the filter 28 become clogged, it can be easily replaced by removing the filter cartridge lid 26 from the filter cartridge cup 24 and replacing the spent filter 28 with a replacement filter.

Undoubtedly, numerous variations and modifications of the invention will become readily apparent to those familiar with hubcap designs for heavy-duty vehicles. For example, while the filter of the preferred embodiment of the invention illustrated is comprised of a layer of hydrophobic material sandwiched between two porous layers of sintered polypropylene plastic, the filter of the invention may be fabricated from other materials and may employ only two layers, or even a single filter layer of material that entraps both water and dirt and dust particles. Accordingly, the scope of the invention should not be construed as limited to the specific embodiment depicted and described, but rather is defined in the claims appended hereto.

We claim:

1. A hubcap breather assembly for mounting in an access opening in a hubcap end wall to seal lubricated wheel bearings in an automotive vehicle comprising:
    a resilient, annular collar having a radial exterior surface configured to fit within said access opening in fluid-tight sealed engagement therewith and a radial interior surface configured to form a filtration cartridge seat,
    a filter cartridge cup having an open outboard mouth, an annular peripheral wall, and a transverse inboard floor with at least one breather port defined therethrough, and said filter cartridge cup is seated upon said filtration cartridge seat,
    a filter cartridge lid having a transverse roof with at least one vent opening therein and a peripheral rim engaged in fluid-tight sealed relationship with said filter cartridge cup mouth to define a filter cartridge chamber within the confines of said filter cartridge cup and said filter cartridge lid, and
    a hydrophobic, gas-permeable, particulate matter filter disposed within and extending entirely across said filter cartridge chamber.

2. A hubcap breather assembly according to claim 1 further characterized in that said filter is comprised of a substance selected from the group consisting of: high density polyethylene, ultra high molecular weight polyethylene, polypropylene, polytetrafluoroethylene, nylon, polyvinylidinefluoride, and polyethersulfone.

3. A hubcap breather assembly according to claim 1 wherein said filter is comprised of a sintered thermoset polymer.

4. A hubcap breather assembly according to claim 1 wherein said filter is comprised of a sintered thermoplastic polymer.

5. A hubcap breather assembly according to claim 1 wherein said filter is comprised of a first porous layer for screening particulate matter and a second hydrophobic layer located inboard from said first porous layer for screening water.

6. A hubcap breather assembly according to claim 5 wherein said first porous layer is comprised of sintered polypropylene plastic.

7. A hubcap breather assembly according to claim 5 wherein said second hydrophobic layer is comprised of a sheet of polytetrafluoroethylene.

8. A hubcap breather assembly according to claim 5 further comprised of a third porous layer for screening particulate matter located inboard from said second hydrophobic layer.

9. A hubcap breather assembly according to claim 8 wherein said third porous layer is comprised of sintered polypropylene plastic.

10. A hubcap breather assembly according to claim 1 wherein said floor of said filter cup is formed with a single, axially centered breather port as aforesaid.

11. A hubcap breather assembly according to claim 10 wherein said roof is formed with a plurality of vent openings as aforesaid and a plenum cavity in communication with all of said vent openings is defined between said roof and said filter.

12. A hubcap breather assembly according to claim 1 wherein said filter cartridge cup is formed with a plurality of mutually parallel positioning pins spaced about its mouth and extending in an outboard direction therefrom and said peripheral rim of said filter cartridge lid is formed with a plurality of mutually parallel sockets formed in said peripheral rim and aligned with said positioning pins, and said positioning pins are frictionally engageable in said sockets.

13. A hubcap breather assembly according to claim 12 wherein said roof of said filter cartridge lid has an underside and said filter cartridge lid is formed with a plurality of radially directed spacer ribs on said underside of said roof whereby said filter is held at a spaced distance from said underside of said roof to form a plenum cavity therebetween.

14. A hubcap breather assembly according to claim 13 wherein said roof is formed with a plurality of vent openings as aforesaid and said plenum cavity is in communication with all of said vent openings.

15. A vented hubcap end closure device for sealing lubricated wheel bearings in an automotive vehicle wheel comprising:
    a resilient, annular collar having a radial outer periphery configured for fluid-tight sealing engagement in a wheel bearing plug opening in an end wall of an automotive vehicle wheel hubcap and a radial inner wall configured to seat a filter unit, wherein said filter unit is comprised of:
        a filter cartridge cup having a radial outer periphery seated against said inner wall of said collar, an outboard rim forming an open mouth, and a transverse inboard floor with at least one breather port defined therethrough, a filter cartridge lid secured to said outboard rim of said filter cartridge cup in fluid-tight sealing engagement with said collar and having a transverse roof that defines a filter cartridge chamber located between said filter cartridge cup floor and said filter cartridge lid roof and said roof has at least one vent opening defined therethrough, and a filtration device extending transversely and entirely across said filter cartridge chamber whereby said filtration device serves as a barrier to the passage of moisture and particulate matter between said at least one vent opening and said at least one breather port.

16. A vented hubcap end closure device according to claim 15 wherein said filter is comprised of a first porous layer for screening particulate matter and a second hydrophobic layer located inboard from said first porous layer for screening water.

17. A vented hubcap end closure device according to claim 16 wherein said first porous layer is comprised of sintered polypropylene plastic.

18. A vented hubcap end closure device according to claim 16 wherein said second hydrophobic layer is comprised of a sheet of polytetrafluoroethylene.

19. A vented hubcap end closure device according to claim 16 further comprised of a third porous layer for screening particulate matter located inboard from said second hydrophobic layer.

20. A vented hubcap end closure device according to claim 19 wherein said third porous layer is comprised of sintered polypropylene plastic.

21. A vented hubcap end closure device according to claim 15 further characterized in that said filter is comprised of a substance selected from the group consisting of: high density polyethylene, ultra high molecular weight polyethylene, polypropylene, polytetrafluoroethylene, nylon, poly-vinylidinefluoride), and polyethersulfone.

22. A vented hubcap end closure device according to claim 15 wherein said filter is comprised of a sintered thermoset polymer.

23. A vented hubcap end closure device according to claim 19 wherein said filter is comprised of a sintered thermoplastic polymer.

24. A vented hubcap end closure device according to claim 15 wherein said floor of said filter cup is formed with a single, axially centered breather port as aforesaid, and wherein said roof is formed with a plurality of vent openings as aforesaid and a plenum cavity residing in communication with all of said vent openings is defined between said roof and said filter.

25. A vented hubcap closure assembly for closing a wheel end bearing chamber containing a fluid lubricant and located behind a hubcap end wall that has a central axial plug opening therein comprising:

a resilient, annular collar inserted into said plug opening and having a radial, outer wall surface that establishes a fluid-tight seal with said hubcap end wall at said central, axial plug opening therein, and a radial inner wall surface having an annular gripping ring defined thereon, an inboard filter cartridge cup having a radial outer annular wall with longitudinal outboard and inboard ends and with a radial outer surface residing in fluid-tight sealed engagement with said radial inner wall of said resilient collar and immobilized from longitudinal movement by said gripping ring, a floor extending across said inboard end of said filter cartridge cup, and a central, axial breather port defined through said filter cartridge cup floor, a filter cartridge lid seated in said collar and having an annular rim disposed in fluid-tight sealing engagement throughout with said radial inner wall surface of said annular collar, and a central roof having at least one vent opening therein, and a filter cartridge chamber is formed between said roof of said filter cartridge lid and said floor of said filter cartridge cup, and a filtration structure extending entirely across said filter cartridge chamber and held in position by said filter cartridge cup and said filter cartridge lid, wherein said filtration structure permits the free passage of air therethrough and excludes the passage of water and particulate matter.

26. A vented hubcap closure assembly according to claim 25 wherein said filtration structure is further comprised of first, second, and third filter layers and said first filter layer is formed of sintered polypropylene and is located outboard from said second layer, and said second layer is formed of a sheet of polytetrafluoroethylene and is located outboard from said third layer and inboard from said first layer, and said third layer is formed of sintered polypropylene.

* * * * *